(12) United States Patent
Cousin

(10) Patent No.: US 7,581,737 B2
(45) Date of Patent: Sep. 1, 2009

(54) WHEELED PLATFORM FOR COUPLING TO A PUSHCHAIR

(75) Inventor: Benoît Cousin, Neuilly sur Seine (FR)

(73) Assignee: Equipbaby (UK) Limited, Windsor, Berkshire (GB)

( * ) Notice: Subject to any disclaimer, the term of this patent is extended or adjusted under 35 U.S.C. 154(b) by 231 days.

(21) Appl. No.: 11/569,183

(22) PCT Filed: Dec. 20, 2004

(86) PCT No.: PCT/FR2004/003311

§ 371 (c)(1),
(2), (4) Date: Nov. 16, 2006

(87) PCT Pub. No.: WO2005/123480

PCT Pub. Date: Dec. 29, 2005

(65) Prior Publication Data

US 2008/0001370 A1    Jan. 3, 2008

(30) Foreign Application Priority Data

May 19, 2004 (FR) .................................. 04 05458

(51) Int. Cl.
*B62B 9/12* (2006.01)
(52) U.S. Cl. ........................ 280/63; 280/32.7
(58) Field of Classification Search ........... 280/87.041, 280/87.043, 63, 79.11, 32.7, 656, 647, 650, 280/642, 47.38
See application file for complete search history.

(56) References Cited

U.S. PATENT DOCUMENTS

| 4,096,920 A | * | 6/1978 | Heyn | ............................ 180/11 |
| 5,887,935 A | | 3/1999 | Sack | |
| 5,909,887 A | | 6/1999 | Hobrath | |
| 6,098,492 A | * | 8/2000 | Juchniewicz et al. | ....... 74/551.3 |
| 6,422,634 B2 | * | 7/2002 | Lundh | ..................... 296/97.21 |
| 6,443,252 B1 | * | 9/2002 | Andes | ....................... 180/65.1 |
| 6,827,356 B2 | * | 12/2004 | Zhuang | ..................... 280/32.7 |

FOREIGN PATENT DOCUMENTS

| DE | 97662 | 7/1897 |
| DE | 295 06009 | 11/1995 |
| DE | 297 19 064 U1 | 1/1998 |
| DE | 297 22 147 U1 | 5/1998 |
| DE | 20023469 U1 | 5/2004 |
| EP | 1104377 B1 | 4/2003 |
| JP | 93/22179 A1 | 4/1999 |
| WO | 93/22179 A1 | 11/1993 |
| WO | 99/16653 A1 | 4/1999 |

* cited by examiner

*Primary Examiner*—Christopher P Ellis
*Assistant Examiner*—Brian Swenson
(74) *Attorney, Agent, or Firm*—McCormick, Paulding & Huber LLP

(57) ABSTRACT

The invention relates to a wheeled platform for coupling to a pushchair, in particular for transporting a standing child, the platform comprising a footplate (2) provided with wheels (3) and at least one coupling arm (4) having a first end (6) fitted to the footplate and a second end (10) adapted to co-operate with means (12, 13) for securing it to the pushchair, wherein the first end (6) of the coupling arm (4) is received directly in an orifice (7) of the footplate (2), without any intermediate part.

13 Claims, 5 Drawing Sheets

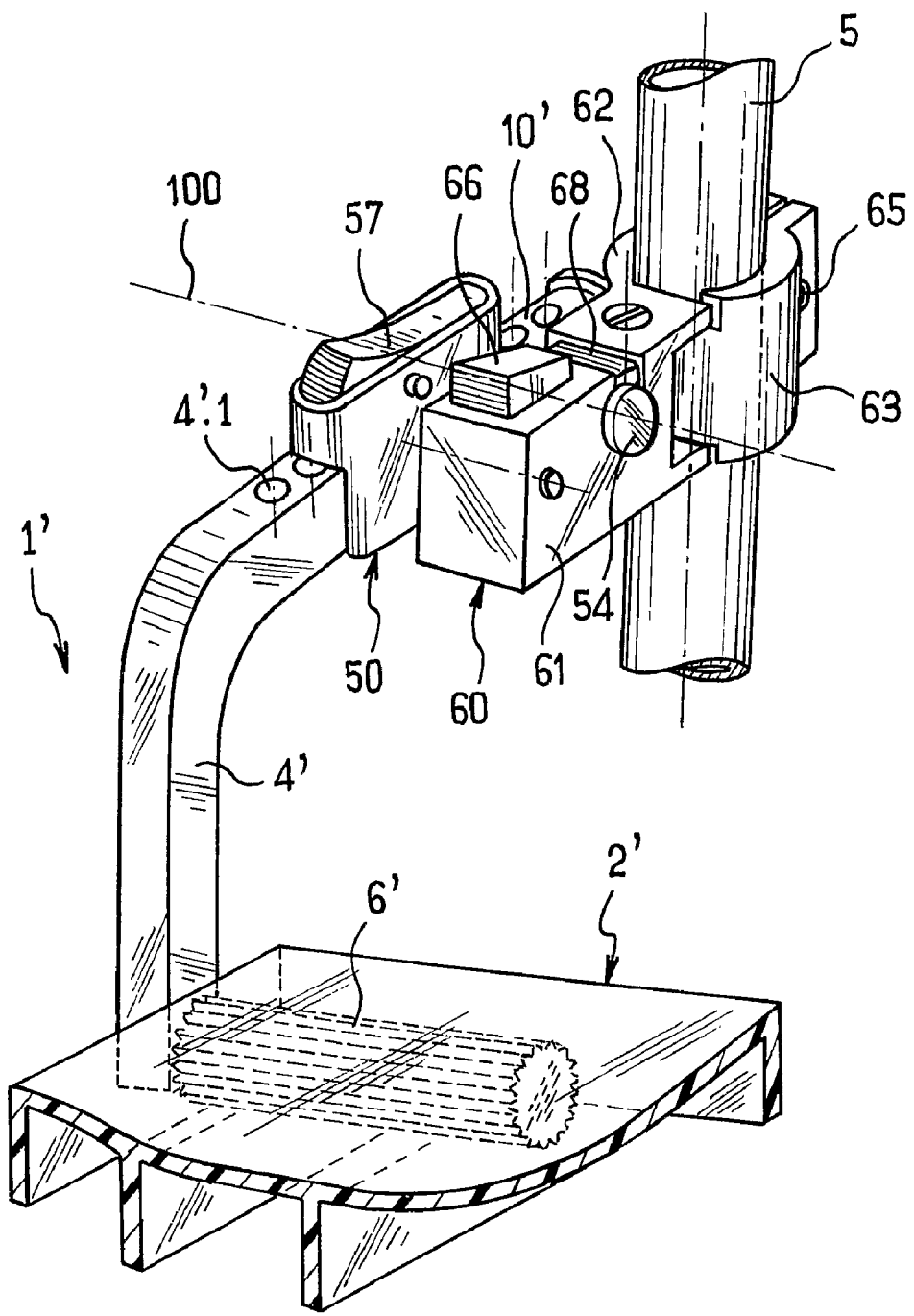
FIG_5

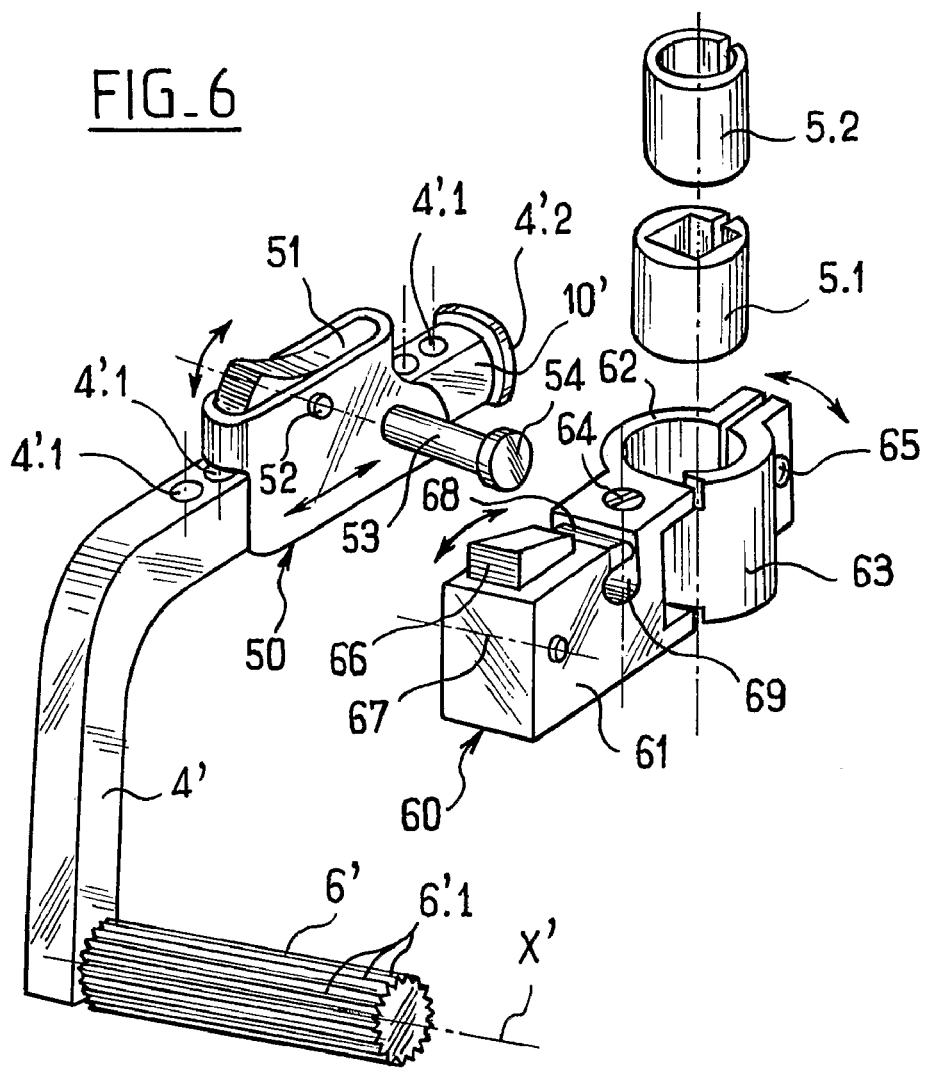
FIG_6

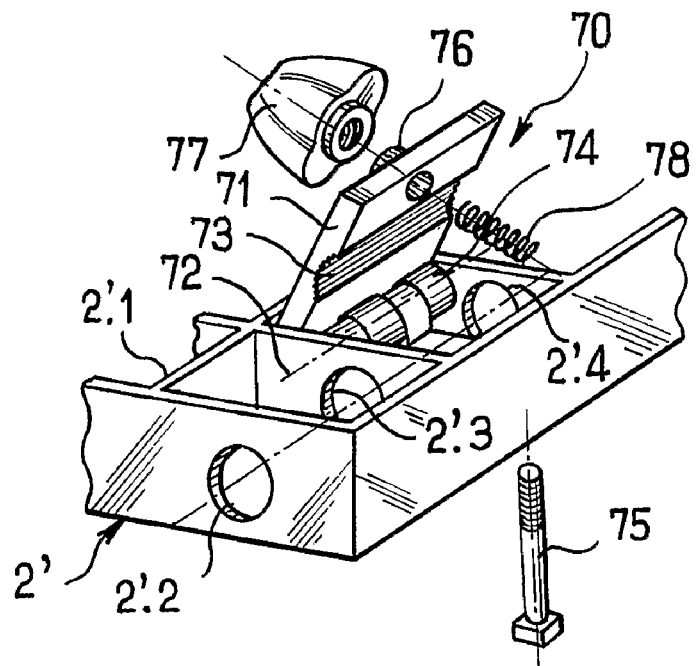
FIG_7a
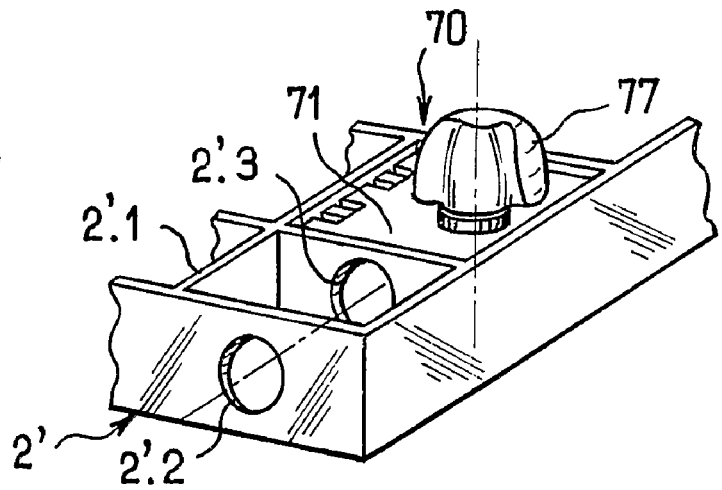
FIG_7b

WHEELED PLATFORM FOR COUPLING TO A PUSHCHAIR

CROSS REFERENCE TO RELATED APPLICATIONS

This application is entitled to the benefit of and incorporates by reference essential subject matter disclosed in International Patent Application No. PCT/FR2004/003311 filed on Dec. 20, 2004 and French Patent Application No. 0405458 filed May 19, 2004.

FIELD OF THE INVENTION

The invention relates to a platform for coupling to a pushchair or stroller or the equivalent.

BACKGROUND OF THE INVENTION

The invention relates more particularly to a wheeled platform for coupling to a pushchair in particular for transporting a standing child, the platform comprising a footplate fitted with wheels and at least one coupling arm having a first end fitted to the footplate and a second end adapted to co-operate with means for securing it to the pushchair.

Patent document EP 1 104 377 describes a platform of the above-specified type, comprising a footplate that is coupled to the pushchair by means of arms having ends fitted to the footplate via bushings.

Specifically, the bushings extend along a common horizontal axis and have stop means for holding the arms angularly relative to the platform, the arms themselves being held angularly in the bushings. Although that disposition does indeed enable the trim of the platform to be adjusted so that said trim is substantially horizontal in use, it is nevertheless relatively complex and expensive to manufacture.

Patent document DE-U-297 19064 describes a wheeled footplate for a pushchair in which the connection between the footplate and the pushchair is provided by a front fitting secured by being screwed directly into the front portion of the platform and being fastened to the rear axle of the pushchair.

Patent document DE-U-200 23469 describes a wheeled footplate for a pushchair in which the bottom ends of the arms pass freely in recesses of the platform: the connection is then voluntarily loose.

WO-A-99/16653 also describes a wheeled footplate for a pushchair in which the platform is connected to the side arms by hinges constituted by lateral studs, so as to allow it to be raised by pivoting.

For the technological background, reference may also be made to the following documents: U.S. Pat. No. 5,887,935, U.S. Pat. No. 5,909,887, DE-C-97 662, DE-U-295 06009, DE-U-297 22147, and WO-A-93/22179.

BRIEF SUMMARY OF THE INVENTION

An object of the invention is to provide a platform for which the connection between the footplate and the arms is simpler than in prior art platforms.

In order to achieve this object, the invention provides a wheeled platform for coupling to a pushchair, in particular for transporting a standing child, the platform comprising a footplate provided with wheels and at least one coupling arm having a first end fitted to the footplate and a second end adapted to co-operate with means for securing it to the pushchair, the platform being remarkable in that the first end of the coupling arm is received directly in an orifice of the footplate, without any intermediate part, in accordance with claim 1.

The connection as organized in this way is particularly simple to manufacture.

In a first embodiment, the orifice extends in a direction that is substantially perpendicular to the footplate.

Advantageously, the orifice and the first end of the arm are then smooth, and the platform includes axial and angular stop means for holding the arm relative to the footplate. Preferably, the stop means comprise a screw for tightening against the first end of the coupling arm. The screw preferably extends from a side of the footplate.

In a second embodiment, the orifice extends in a direction that is substantially parallel to the footplate and perpendicularly to a vertical midplane of said footplate.

Advantageously, the orifice is then smooth and the first end of the coupling arm comprises a cylindrical shaft segment presenting axial fluting, and the platform includes axial and angular stop means for holding the arm relative to the footplate and co-operating with said axial fluting. In particular, the stop means comprise a shoe movable between an active, locking position and an inactive, unlocking position, said shoe presenting a fluted bearing surface that co-operates in the active position of the shoe with the axial fluting of the cylindrical shaft segment in order to provide axial and angular locking.

According to another aspect of the invention, the second end is connected to a fastener sleeve suitable for being detachably fitted to a coupling member fitted to the pushchair.

Advantageously, the connection between the second end and the fastener sleeve is then slidable in order to adjust the length of the coupling arm, with locking being provided in a plurality of predetermined axial positions.

More preferably, the fastener sleeve includes fastener members for fastening to the coupling member, said fastener members providing angular indexing of the fastener sleeve relative to the coupling member. Advantageously, the fastener sleeve is then fitted on a ferrule pivotally mounted on the coupling member, the coupling member including indexing members for indexing the ferrule relative to the coupling member.

BRIEF DESCRIPTION OF THE DRAWINGS

The invention can be better understood in the light of the following description given with reference to the figures of the accompanying drawings, in which:

FIG. 5 is a fragmentary view in perspective showing a platform constituting a second embodiment of the invention, coupled to a pushchair;

FIG. 6 is an exploded view of the arm system used in the FIG. 5 embodiment; and

FIGS. 7a and 7b are views from beneath of the axial and angular locking system having a moving shoe co-operating with the fluted end of the FIG. 6 arm.

DETAILED DESCRIPTION OF THE INVENTION

Figure 1:
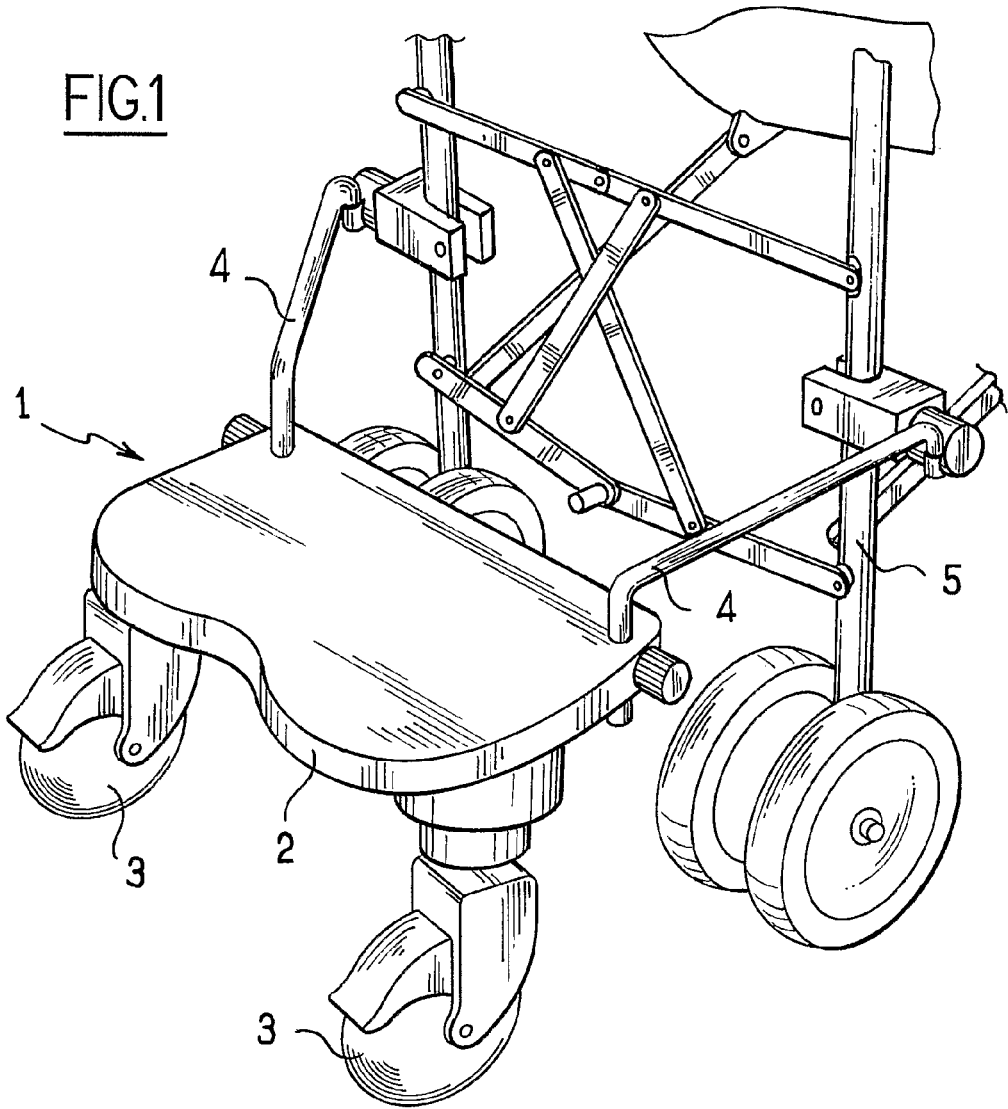
FIG. 1 is a perspective view of a platform constituting a first embodiment of the invention, and shown coupled to a pushchair.
Figure 2:
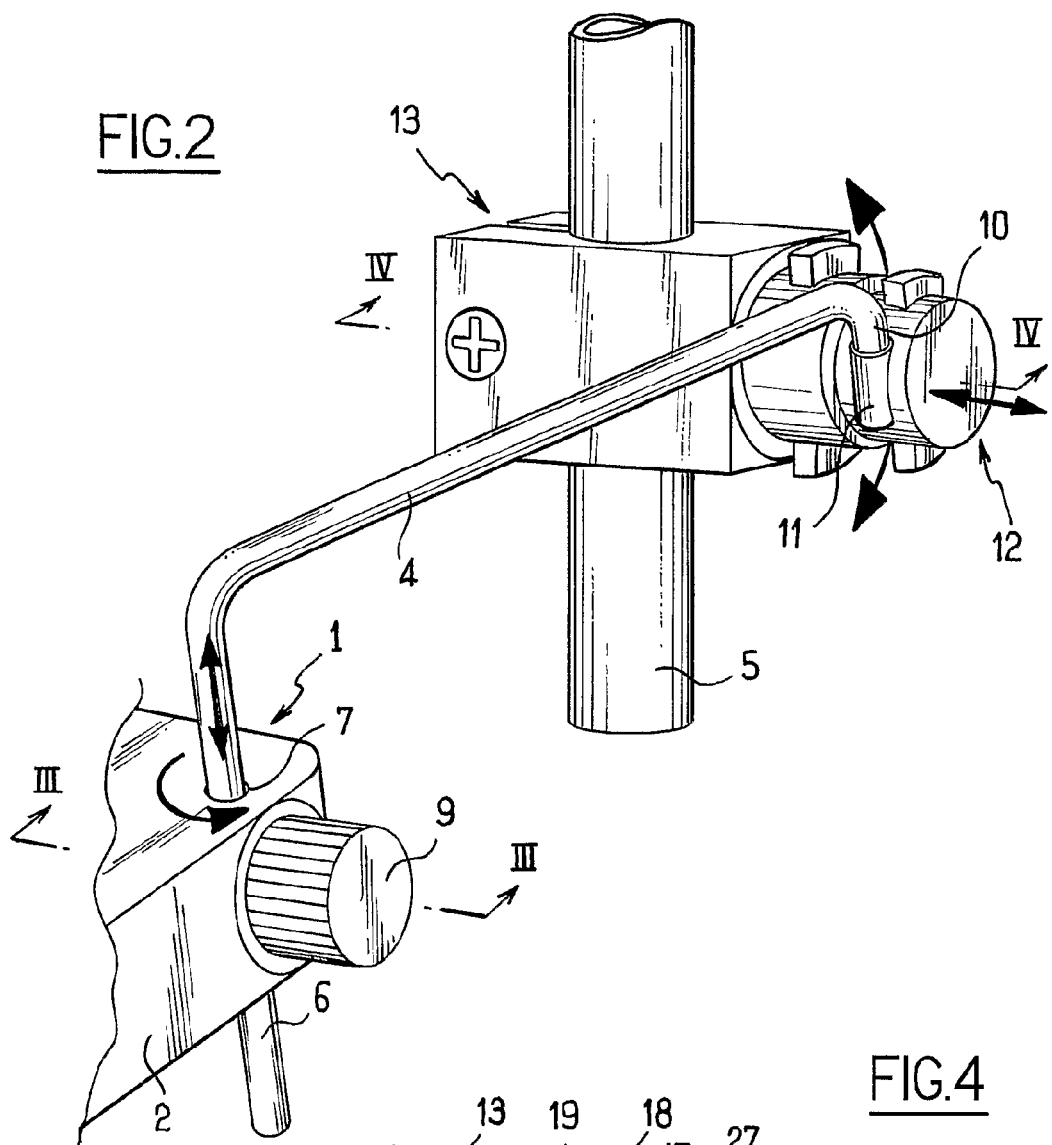
FIG. 2 is an enlarged view of FIG. 1 showing one of the arms of the platform.

With reference to FIGS. 1 and 2, the platform of the invention, given overall reference 1, comprises a footplate 2 fitted with wheels 3 for running on the ground and arms 4 for coupling to a pushchair 5. The footplate 2 is for receiving a standing child.

Figure 3:
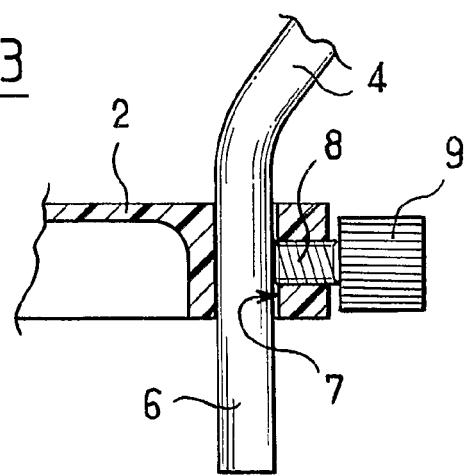
FIG. 3 is a section view on line III-III of FIG. 2, showing the connection between one of the arms and the footplate.

As can be seen in FIG. 2, each of the arms 4 has a first end 6 that is received directly in an orifice 7 in the footplate 2. This particularly simple connection allows the arms 4 to be adjusted axially and angularly relative to the footplate 2, as represented by arrows in FIG. 2. As can be seen in FIG. 3, a set screw 8 having a knob-forming head 9 serves to hold the end 6 in the orifice 7 both axially and angularly. It should be observed that the knob 9 projects from a side of the footplate 2, in a location that is spaced apart from the feet of the child.

As can be seen in FIG. 2, each of the arms 4 has a second end 10 that is received with freedom to turn in a receptacle 11 in a fastener sleeve 12. The fastener sleeve 12 is releasably fitted on a coupling member 13, itself fitted to the pushchair 5.

Figure 4:
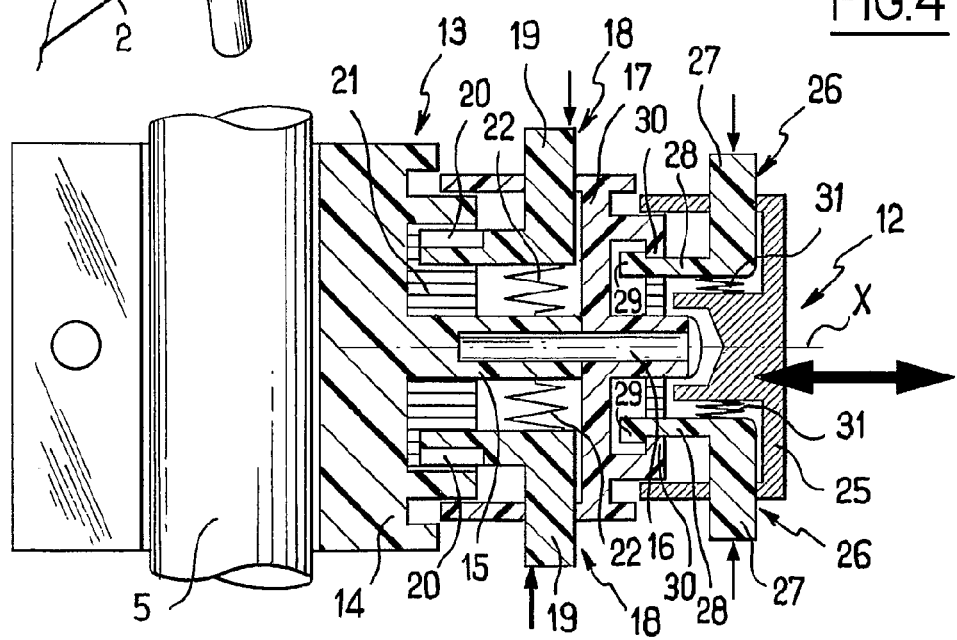
FIG. 4 is a section view on line IV-IV of FIG. 2 showing the connection between one of the arms and the pushchair.

As can be seen in FIG. 4, the coupling member 13 comprises a body 14 forming a clamp for fastening to one of the uprights of the pushchair 5. An elongate portion 15 extends from the body 14 and receives a pivot 16 on which a ferrule 17 is mounted to turn about the hinge axis X.

The ferrule 17 carries two radially-movable indexing members 18, each having a knob portion 19 extending radially through the wall of the ferrule 17, and a stop portion 20 that extends axially to co-operate with an internal toothed ring 21 formed inside the body 14. Springs 22 act on the indexing members 18 to urge the stop portions 20 into co-operation with the toothed ring 21, so that the ferrule 17 is prevented from turning relative to the body 14. In order to turn the ferrule 17, it suffices to squeeze together the knob portions 19 of the indexing members 18 against the springs 22 (as represented by arrows in the figure) so as to move the stop portions 20 away from the toothed ring 21. The ferrule 17 is then free to turn relative to the body 14.

The fastener sleeve 12 comprises a body 25 in which the receptacle 11 is formed. The body 25 carries two radially-movable fastener members 26, each comprising a knob portion 27 extending radially through a wall of the body 25, and a fastener portion 28 that extends axially. The fastener portion 28 has an end forming a step 29 that co-operates with a rim 30 of the ferrule 17 to prevent the fastener sleeve 12 from moving axially relative to the ferrule 17. Springs 31 act on the fastener members to urge them into a position where they co-operate with the rim 30 of the ferrule 17. To release the sleeve 12 relative to the ferrule 17, it suffices to squeeze together the knob portions 27 of the fastener members 26 against the springs 31 so that the steps 29 are moved away from the rim 30.

It should be observed that the rim 30 is internally notched and co-operates with the fastener portions 28 of the fastener members 26 in order to provide angular indexing of the fastener sleeve 12 relative to the ferrule 17.

The platform of the invention is used as follows: the coupling members 13 are fitted to the pushchair 5. Then the screws 8 are used to adjust the positions of the arms 4 relative to the footplate 2 so that in use the footplate is substantially horizontal. Finally, the fastener sleeves 12 are fitted to the ferrules 17 with which the coupler members 13 are equipped.

When the footplate is no longer of use, it can either be removed by separating the fastener sleeve 12 from the coupling members 13, or else it can be caused to pivot by pressing on the indexing members 18 of the ferrule 17 so as to fold the footplate up against the pushchair. It then suffices to release the indexing members 18 and the footplate is held in its position folded up against the push-chair.

A second embodiment of the invention is described below with reference to FIGS. 5 to 7.

As before, in the platform 1', the end 6' of the coupling arm 4' is received directly in an orifice in the footplate 2' without any intermediate part. However in this example the orifice extends in a direction that is substantially parallel to the footplate 2', and perpendicular to the vertical midplane of said footplate.

As can be seen more clearly in FIG. 7, the footplate 2' presents partitions 2'.1 on its underside with three holes 2'.2, 2'.3, and 2'.4 in alignment forming the above-mentioned orifice, these holes being smooth and serving to receive the end of the coupling arm 4'.

In this embodiment, the end 6' of the coupling arm 4' comprises a cylindrical shaft segment presenting axial fluting 6'.1, and the platform 1', and more precisely its footplate 2' includes stop means referenced 70 (not shown in FIG. 5) for holding the arm 4' axially and angularly relative to the footplate 2', said means co-operating with the axial fluting.

In this embodiment, the stop means 70 comprise a shoe 71 that is pivotally movable about an axis 72 between an active, locking position (FIG. 7b), and an inactive, unlocking position (FIG. 7a). For this purpose, the shoe 71 presents a fluted bearing surface 73 that co-operates in the active position of the shoe 71 with the axial fluting 6'.1 of the cylindrical shaft segment 6' in order to provide axial and angular locking. The shoe 71 is fitted with a pivot hinge 74 and with a ring 76 through which there passes a bolt 75 whose threaded end screws into a knob member 77. A spring 78 tends to urge the shoe 71 into its unlocking position. It can easily be understood that by tightening the knob member 77, the fluting on the bearing surface 73 and the fluting on the fluted end 6' come into engagement, thereby producing angular locking of the arm 4' in the desired inclined position. Final tightening produces the axial locking (along the axis X' of the end 6') in the position desired for lateral spacing. By loosening the member 77, it is possible to adjust the inclination and/or the spacing of the arm 4'.

The other end of the arm 4' passes into a securing block or sleeve 50, and presents an end collar 4'.2 to prevent said block from escaping. It can be seen that the end 10' has a plurality of holes 4'.1 suitable for receiving a locking finger (not shown) carried by a latch 51 that is mounted on the block 50 to pivot about an axis 52. The latch 51 is biased by a spring (not shown) tending to hold the finger in the hole that corresponds to the desired position: this makes it possible to obtain locking in a plurality of predetermined axial positions, with the block, when unlocked, being free to slide on the end 10'.

The block 50 also carries a lateral finger 53 having a head 54, which finger is received in an associated cylindrical housing 69 of a coupling member 60 that is fitted to the pushchair.

The coupling member 60 comprises a body 61 terminated by a stationary jaw 62, and a moving jaw 63 (pivotable about an axis 64), these two jaws clamping around an upright 5 of the pushchair, with locking in the desired position being obtained by means of a screw 65. FIG. 6 shows bushings 5.1, 5.2 optionally used for uprights 5 of square section, or of round section of smaller diameter. The member 60 also presents a moving locking element 66 mounted to pivot about an axis 67 and terminated by a tip 68 which either opens or closes the housing 69, depending on the position of said locking element. The locking element 66 presents an external knob portion, and it is urged by a spring (not shown) into the locking position as shown in FIGS. 5 and 6.

Once in place, the finger 53 enclosed in the housing 69 constitutes a horizontal hinge axis enabling the footplate 2' to be raised.

If it is desired to remove the arm- and foot-plate assembly, it suffices to press on the locking element 66 in order to retract the tip 68, and then disengage the finger 53.

The invention is not limited to the particular embodiments of the invention described above, but on the contrary covers any variant coming within the ambit of the invention as defined by the claims.

Although the first embodiment of the invention is shown as having a footplate with smooth orifices in which the arms are received directly, without any intermediate parts, the orifices need not be smooth, for example they could have grooves co-operating with splines on the arms so as to provide angular indexing for the arms relative to the footplate.

Although the arms are shown as being mounted to move freely axially in the orifices in the footplate, the arms could include one or two abutments for limiting their axial displacement within the orifices.

Although the orifices shown extend substantially perpendicularly to the footplate, the orifices could be at an arbitrary orientation relative to the footplate.

Although the platform described has two coupling arms, the platform need have only one coupling arm.

Although it is stated that the rim 30 of the ferrule 71 is oriented in such a manner that the sleeve is indexed in position relative to the ferrule, it is possible to provide notches over a fraction only of the rim so as to leave the platform with a certain degree of freedom in pivoting relative to the pushchair when in use, thus serving to accommodate irregularities of the ground without stressing the connection between the pushchair and the platform, and while still allowing the platform to be indexed in a storage position against the pushchair.

Similarly, in the second embodiment of the invention, it is possible to use different means for providing the axial and/or angular locking of each of the coupling arms.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A wheeled platform for coupling to a pushchair, in particular for transporting a standing child, the platform comprising a footplate provided with wheels and at least one coupling arm having a first end fitted to the footplate and a second end adapted to co-operate with means for securing it to the pushchair, wherein the first end of the coupling arm is received directly in an orifice of the footplate, without any intermediate part, wherein the orifice and the first end of the arm are smooth, wherein the platform includes axial and angular stop means for holding the arm relative to the footplate, and wherein the stop means comprises a screw for tightening against the first end of the coupling arm.

2. The platform according to claim 1, wherein the orifice extends in a direction that is substantially perpendicular to the footplate.

3. The platform according to claim 1, wherein the orifice extends in a direction that is substantially perpendicular to the footplate, and wherein the screw extends from a side of the footplate.

4. The platform according to claim 1, wherein the second end is connected to a fastener sleeve suitable for being detachably fitted to a coupling member fitted to the pushchair.

5. The platform according to claim 4, wherein the connection between the second end and the fastener sleeve is slidable in order to adjust the length of the coupling arm, with locking being provided in a plurality of predetermined axial positions.

6. The platform according to claim 4, wherein the fastener sleeve includes fastener members for fastening to the coupling member, said fastener members providing angular indexing of the fastener sleeve relative to the coupling member.

7. The platform according to claim 6, wherein the fastener sleeve is fitted on a ferrule pivotally mounted on the coupling member, the coupling member including indexing members for indexing the ferrule relative to the coupling member.

8. A wheeled platform for coupling to a pushchair, in particular for transporting a standing child, the platform comprising a footplate provided with wheels and at least one coupling arm having a first end fitted to the footplate and a second end adapted to co-operate with means for securing it to the pushchair, wherein the first end of the coupling arm is received directly in an orifice of the footplate, without any intermediate part, wherein the orifice extends in a direction that is substantially parallel to the footplate and perpendicularly to a vertical midplane of said footplate, wherein the orifice is smooth and the first end of the coupling arm comprises a cylindrical shaft segment presenting axial fluting, and wherein the platform includes axial and angular stop means for holding the arm relative to the footplate and co-operating with said axial fluting.

9. The platform according to claim 8, wherein the stop means comprise a shoe movable between an active, locking position and an inactive, unlocking position, said shoe presenting a fluted bearing surface that co-operates in the active position of the shoe with the axial fluting of the cylindrical shaft segment in order to provide axial and angular locking.

10. The platform according to claim 8, wherein the second end is connected to a fastener sleeve suitable for being detachably fitted to a coupling member fitted to the pushchair.

11. The platform according to claim 10, wherein the connection between the second end and the fastener sleeve is slidable in order to adjust the length of the coupling arm, with locking being provided in a plurality of predetermined axial positions.

12. The platform according to claim 10, wherein the fastener sleeve includes fastener members for fastening to the coupling member, said fastener members providing angular indexing of the fastener sleeve relative to the coupling member.

13. The platform according to claim 12, wherein the fastener sleeve is fitted on a ferrule pivotally mounted on the coupling member, the coupling member including indexing members for indexing the ferrule relative to the coupling member.

* * * * *